US008799343B2

(12) United States Patent
Gueron et al.

(10) Patent No.: US 8,799,343 B2
(45) Date of Patent: Aug. 5, 2014

(54) MODULAR EXPONENTIATION WITH PARTITIONED AND SCATTERED STORAGE OF MONTGOMERY MULTIPLICATION RESULTS

(75) Inventors: Shay Gueron, Haifa (IL); Vlad Krasnov, Nesher (IL)

(73) Assignee: Intel Corporation, Santa Clara, CA (US)

( * ) Notice: Subject to any disclaimer, the term of this patent is extended or adjusted under 35 U.S.C. 154(b) by 497 days.

(21) Appl. No.: 13/241,137

(22) Filed: Sep. 22, 2011

(65) Prior Publication Data

US 2013/0080493 A1    Mar. 28, 2013

(51) Int. Cl.
*G06F 7/38* (2006.01)
(52) U.S. Cl.
USPC .......................................................... 708/491
(58) Field of Classification Search
CPC ....... G06F 7/7285; G06F 7/7214; G06F 7/72; G06F 7/7292; G06F 7/7221
USPC .......................................................... 708/491
See application file for complete search history.

(56) References Cited

U.S. PATENT DOCUMENTS

| 6,598,061 B1 * | 7/2003 | Symes et al. ................ 708/491 |
| 7,065,788 B2 | 6/2006 | Yajima et al. |
| 7,506,015 B1 * | 3/2009 | Graham ........................ 708/491 |
| 2002/0013799 A1 * | 1/2002 | Blaker ......................... 708/491 |
| 2004/0010530 A1 * | 1/2004 | Freking et al. ................ 708/491 |
| 2007/0266068 A1 * | 11/2007 | Fit-Florea et al. ............ 708/491 |
| 2008/0152127 A1 * | 6/2008 | Fayad et al. .................. 708/491 |
| 2009/0092245 A1 | 4/2009 | Fumaroli et al. |
| 2010/0146029 A1 | 6/2010 | Higashi |
| 2010/0332578 A1 | 12/2010 | Gopal et al. |

OTHER PUBLICATIONS

Montgomery, Peter L. "Modular Multiplication Without Trial Division", Mathematics of Computation, vol. 44, No. 170, pp. 519-521, Apr. 1985.
International Search Report and Written Opinion mailed Feb. 19, 2013 for International Application No. PCT/US2012/054503, 9 pages.

* cited by examiner

*Primary Examiner* — Tan V. Mai
(74) *Attorney, Agent, or Firm* — Schwabe, Williamson & Wyatt, P.C.

(57) ABSTRACT

Embodiments of techniques and systems for side-channel-protected modular exponentiation are described. In embodiments, during a modular exponentiation calculation, Montgomery Multiplication ("MM") results are produced. These MM results are scattered through a table for storage, such that storage of the values may not lead to discovery of a secret exponent value by a spy process through a side-channel attack. The scattering may be performed in order to reduce a number of per-result memory operations performed during each MM result storage or retrieval. In embodiments, a window size of 4 may be used in the modular exponentiation, along with partitioning of the MM result into 32-bit partition values which are scattered with offsets of 64-bytes. In embodiments, while use of a window size of 4 may result in additional MM calculations during modular exponentiation than other window sizes, the reduction in memory operations may provide a positive performance offset.

20 Claims, 5 Drawing Sheets

MODULAR EXPONENTIATION WITH PARTITIONED AND SCATTERED STORAGE OF MONTGOMERY MULTIPLICATION RESULTS

TECHNICAL FIELD

This application relates to the technical field of data processing, more specifically to modular exponentiation with partitioned and scattered storage of Montgomery Multiplication results.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Many cryptographic operations, such as the Rivest, Shamir and Adleman ("RSA") cryptographic process, may rely on one or more modular exponentiations. A modular exponentiation may include operations to determine a value for $a^x$ mod m for input values a, x, and m. In various techniques, a "windowed" exponentiation process may be performed based on a "window size" value w. In such a w-ary modular exponentiation, a loop may iterate through exponent bits in groups of w bits during calculation of an exponentiation result.

For example, the following w-ary modular exponentiation process uses known calculations called Montgomery Multiplications (or "MMs") to determine a modular exponentiation result. The process may take as input values m, a (which may be less than m), and a secret exponent value x to compute $a^x$ mod m as an output. x may be expressed based on a window size parameter w as $$x = x_0 + x_1 2^w + x_2 2^{2w} + \ldots + x_k 2^{kw}$$

where $0 \leq x_0, x_1, \ldots, x_k \leq 2^w - 1$. The process may also rely on a Montgomery parameter s, as well as a pre-computed value $c_2 = 2^{2s}$ mod m.

The process may be expressed as follows. In the expression of the process,
Montgomery Multiplications are referred to as "MMs."

```
1.   a' = MM(a,c₂)
2.   m[0] = MM(c₂,1)
3.   m[1] = a'
4.   For i = 2,...,2^w - 1
       4.1   m[i] = MM(m[i-1],a')
     End For
5.   Store m[0],...,m[2^w - 1] in a table A
6.   Retrieve m[x_k] from table A
7.   h = m[x_k]
8.   For i = k - 1,...,0
       8.1   For j = 1,...,w
               8.1.1   h = MM(h,h)
             End For
       8.2   Retrieve m[x_i] from table A
       8.3   h = MM(h,m[x_i])
     End For
9.   h = MM(h,1)
     Return h
```

MM results may have a bit-size equal to the number of bits in the modulus (m) value. As detailed above, a table of these MM results may be generated during execution of a windowed modular exponentiation process. As shown above, the table may hold $2^w$ MM result entries. These stored MM results may later be retrieved and used to calculate the modular exponentiation output through further MM calculations.

However, this process may present security vulnerabilities. If cached memory is used to store the MM results, the MM results may be vulnerable to a side-channel attack. In some side-channel attacks, a spy process running in one thread can store values into memory at the locations that the exponentiation process (in another thread) will use for its MM table. The spy process may then wait for an iteration of the RSA process to occur and then reads the spy process's values back.

While the spy process may not be able to see the values written by the RSA process, the spy process may measure the response time for its own reads. If a spy read takes longer than expected, that may then mean that the associated portion of the cache was written to by the RSA process, evicting the spy's value in the cache. The spy process may then be able to recover w bits of the secret exponent x. Over time, the entire secret x value may be compromised.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
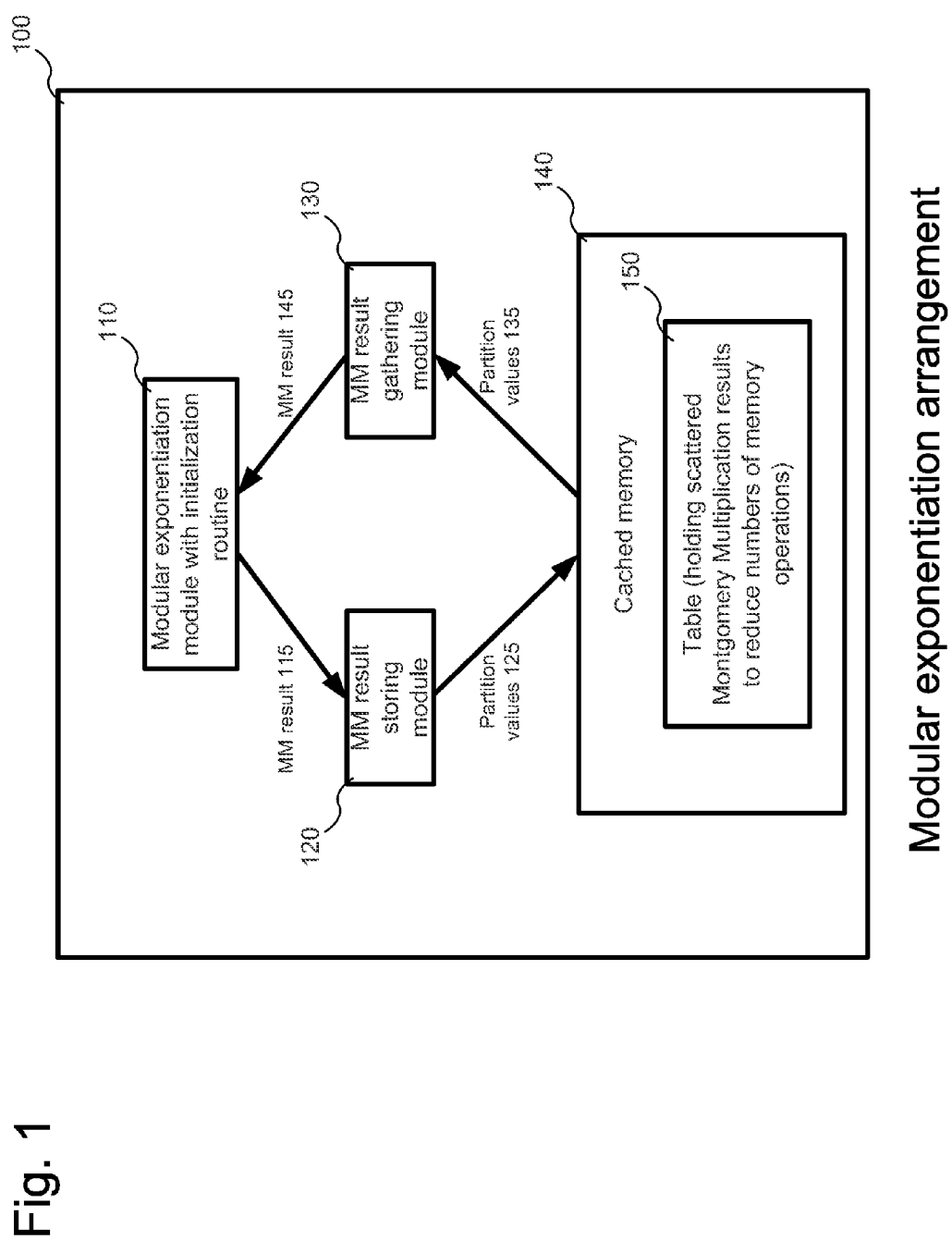
FIG. 1 is block diagram illustrating an example modular exponentiation arrangement with Montgomery Multiplication storing and gathering modules, in accordance with embodiments of the present disclosure.

Methods, apparatuses, and storage media associated with side-channel-protected windowed exponentiation are disclosed herein. In various embodiments, a computer-implemented method may include initializing a table, by a computing device, in a memory of the computing device, the table having a size. The method may also include performing, by the computing device, a first plurality of Montgomery Multiplications. The method may also include storing, by the computing device, results of the first plurality of Montgomery Multiplications into the table, the storing of each result into the table. The storing may include partitioning the particular result into multiple partition values and storing the partition values of the particular result scattered across the table. The method may also include performing, by the computing device, a second plurality of Montgomery Multiplications using the stored partition values of the results of the first plurality of Montgomery Multiplications scattered in the table. Initializing the table may include selecting the size of the table to at least reduce a number of memory accesses performed during retrieval of the stored partition values of the results of the first plurality of Montgomery Multiplications scattered in the table during performance of the second plurality of Montgomery Multiplications.

In various embodiments, an apparatus may be equipped to practice one or more of the methods described herein. In various embodiments, the apparatus may include a computer-readable memory and one or more computer processors coupled to the memory. the apparatus may also include a Montgomery Multiplication result storing module configured to be operated by the one or more computer processors to store partition values of Montgomery Multiplication results scattered across a table in the memory. The apparatus may also include a Montgomery Multiplication result gathering module configured to be operated by the one or more computer processors to reconstruct Montgomery Multiplication results from corresponding stored partition values scattered across the table. The apparatus may also include an initialization routine to be operated by the one or more computer processors, and configured to initialize the table. The initialization module may be configured to initialize the table in a manner such that memory operations performed by the Montgomery Multiplication result gathering module during reconstruction of Montgomery Multiplication results based on corresponding partition values stored and scattered across the table by the Montgomery Multiplication result storing module are reduced.

In various embodiments one or more non-transitory computer-readable media may include instructions that, in response to execution by a computing device, cause the computing device to perform one or more operations of various methods described herein.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separately operations should not be construed as requiring that the operations be necessarily performed independently and/or by separate entites.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Referring now to FIG. 1, wherein a block diagram illustrating a modular exponentiation system 100 for performing modular exponentiation calculations in accordance with embodiments of the present disclosure. In various embodiments, the modular exponentiation system 100 may be configured to receive modular exponentiation inputs, such as the aforementioned input values a, x, and m, and to output a modular exponentiation result $a^x$ mod m. In various embodiments, the modular exponentiation system 100 may be utilized as part of a cryptographic system, such as a system utilizing the RSA cryptographic process. In various embodiments, the modular exponentiation system 100 may be configured to store Montgomery Multiplication results ("MM results") in such a manner that they may be protected from a side-channel attack. In various embodiments, the modular exponentiation system 100 may also be configured to store the MM results such that a number of memory accesses performed during storage and retrieval MM results is lessened, thereby providing the protection against side-channel attack efficiently. In various embodiments, the modular exponentiation system 100 may also be configured to lessen a number of Montgomery Multiplications that are performed during calculation of modular exponentiation results. In various embodiments, the lessening of the number of memory accesses performed and/or the lessening of the number of MMs that are performed may provide for more efficient generation of modular exponentiation results.

In various embodiments, the modular exponentiation system 100 may include a modular exponentiation module 110, which may perform modular exponentiation operations. In various embodiments, the modular exponentiation module 110 may generate one or more MM results 115 during calculation of a modular exponentiation result. For example, these MM results 115 may be generated during performance of the example modular exponentiation process described above. In various embodiments, the modular exponentiation module 110 may include an initialization routine configured to initialize a table for use to store the MM results. In alternate embodiments, the initialization routine may be a standalone routine, separated from the modular exponentiation module 110, or integrated with other modules.

In various embodiments, the modular exponentiation system 100 may comprise an MM result storing module 120. In various embodiments, the MM result storing module 120 may receive MM results 115 from the modular exponentiation module 110 and may store these MM results 115 scattered across a table (such as table 150) for later retrieval. In various embodiments, the MM result storing module 120 may perform the scattered storing, at least in part, by generating partition values 125 based on the received MM results 115. In various embodiments, the generated partition values 125 may be stored scattered across the table 150.

In various embodiments, the table 150 may be stored in a cached memory 140. The scattered storing of the MM results 115 as partition values 125 in the table 150 may be performed in order to reduce the vulnerability of the side-channel-protected modular exponentiation system 100 to side-channel attacks. In various embodiments, by storing the MM results in a scattered manner, a single cache line may contain partition values from multiple MM results. As such, even if a spy thread were able to identify a cache line that has been written during a modular exponentiation, the spy thread still may not be able to infer which MM results lead to the writing of the cache line. However, the scattered storing of MM results may also require that multiple cache lines be written to or read from to store or retrieve an MM result. Thus, in various embodiments, and as described below, the MM results 115 may be stored scattered across the table 150 in a manner such that a number of memory accesses performed during storage and retrieval of the scattered MM results may be lessened, thereby improving the efficiency of operation.

In various embodiments, the MM result storing module 120 may be configured to generate the partition values 125 and to store the partition values 125 scattered across the table 150 by operating with a window size w that is chosen to reduce memory accesses. Thus, in some embodiments, the MM result storing module 120 may operate using a window size value of w=4. As discussed above, in various embodiments, the table 150 of stored MM results may be of size $2^w$, leading to the table 150 holding 16 MM results when w=4. In various embodiments, the choice of a window size may also affect operations of the modular exponentiation module 110, as described below.

In various embodiments, the MM result storing module 120 may be configured to divide the 512-bit MM result values into 32-bit double-word-("dword-") size values and to output these dword-size values as the partition values 125. In various embodiments the MM result storing module 120 may also be configured to space or offset the dword-size partition values 125 by 16 dwords each (e.g. 64 bytes each). That is, each partition value 125 may be stored offset by at least 64 bytes from another partition value.

Figure 2:
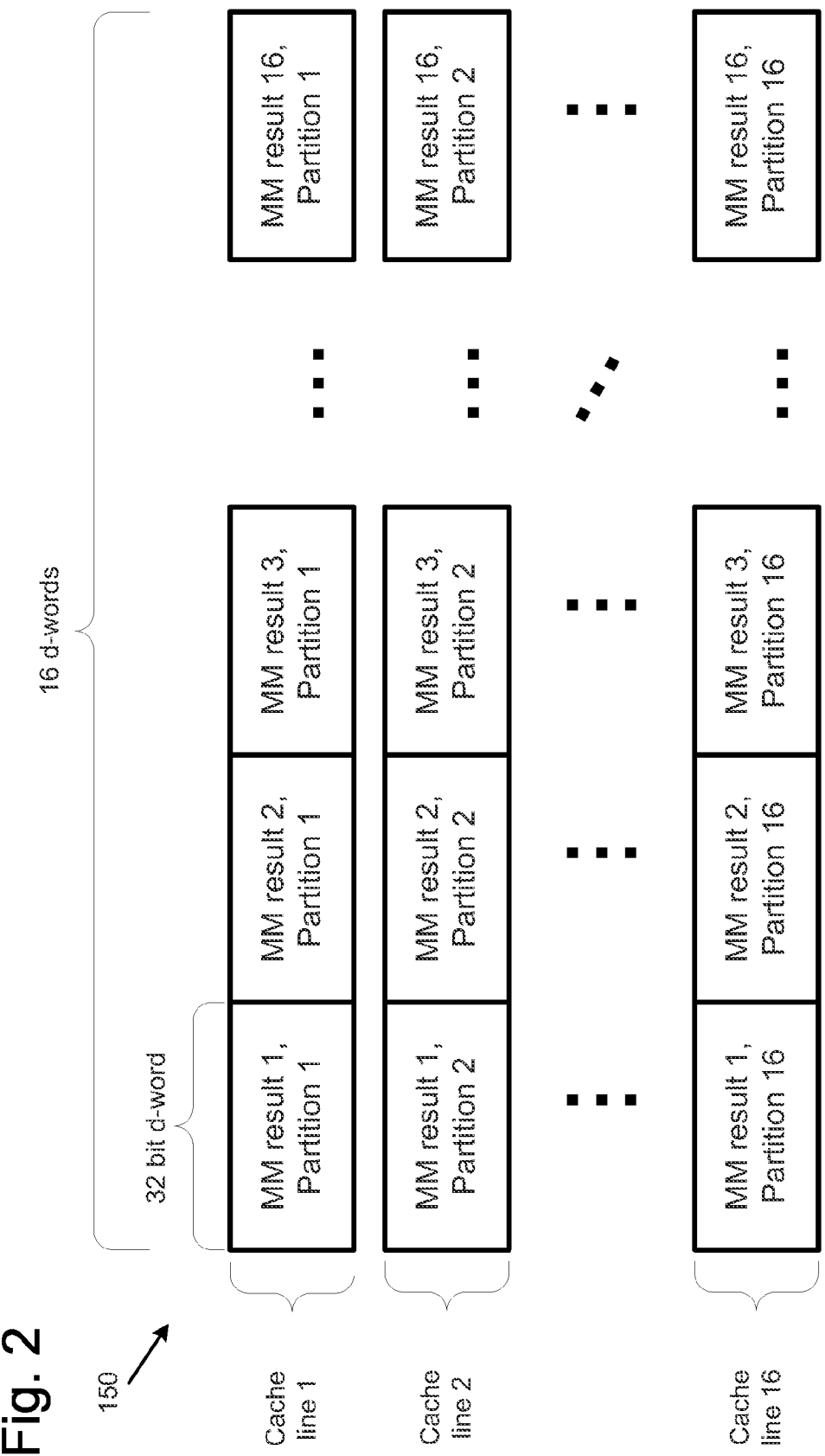
FIG. 2 is a block diagram illustrating an example of scattered Montgomery Multiplication results, in accordance with various embodiments.

FIG. 2 is a block diagram illustrating an example of Montgomery Multiplication results stored scattered across a table 150, in accordance with various embodiments. As FIG. 2 shows, the table 150 may, in various embodiments, contain 16 MM results, each of which may be partitioned into 16 separate partition values. In particular, if the table 150 is covered by 16 64-byte cache lines, as illustrated, each partition value for a given MM result may fall within a separate cache line. In various embodiments, the MM result store module 120 therefore may store a single 512-bit MM result scattered across 16 separate cache lines. Thus, in various embodiments, if a single MM result is to be written to the table, all 16 cache lines will be written to, rather than a single cache line. Similarly, during a read, all 16 cache lines may be read from in order to assemble a single MM result. As discussed above, because all 16 cache lines are read from or written to, in various embodiments a spy process may not be able to determine which MM result is being stored or retrieved at a given time, providing additional protection against side-channel attacked.

In various embodiments, the choice of a window size of 4, along with a choice to partition MM results into dword-size partition values, may provide for more efficient computation. Thus, in contrast to the embodiments described above a choice of a window size of 5 may lead to storing 32 MM results scattered across a table. In some implementations, these 32 MM results may be stored as 1-byte partition values with offsets of 32 bytes scattered in the table; this may require 64 reads or writes per MM result access. In other implementations, the 32 MM results may be stored as 16-bit "word"-size partition values, with offsets of 64 bytes, scattered in the table; this scattered storing technique may reduce the number of memory accesses per MM result retrieve or store to 32 reads or writes. By contrast, as discussed above, the use of a window size of 4 may lead to 16 reads or writes per MM result retrieval or storage. This may reduce the effect of the scattered storing on memory performance during operation to provide side-channel protection for the modular exponentiation system.

In various embodiments, use of a window size of 4 may also affect computations performed by the modular exponentiation module 110. However, even in cases when these changes lower efficiency, the changes may be offset by changes in memory access operations. For example, using a window size of 4 may cause the number of MM results computed per exponentiation to go up to 144 vs. 135 for a window size of 5. However, in various embodiments, this small increase in number of MM results may be compensated for by reducing the number of memory operations per scattered MM result by 50%. In various embodiments, this offset may result in a net increase in performance. Additionally, in various embodiments, by using a 16-value table (for window size 4) instead of a 32-value table (for window size 5), an additional amount of 1024 bytes may be freed in the cache for use by other aspects of the modular exponentiation process. It may be recognized, however, that in other embodiments, other window sizes and/or scattering techniques may be used.

Returning to FIG. 1, in various embodiments, the modular exponentiation system 100 may also include an MM result gathering module 130. In various embodiments, the MM result gathering module 130 may gather from the table 150, stored partition values 135 of MM results scattered in the table 150. The MM result gathering module 130 may, in turn, generate MM results 145 based on the gathered corresponding partition values. The MM result gathering module 130 may then return these generated MM results to the modular exponentiation module 110. In various embodiments, the modular exponentiation module 110 may then use these returned MM results to generate modular exponentiation results.

Figure 3:
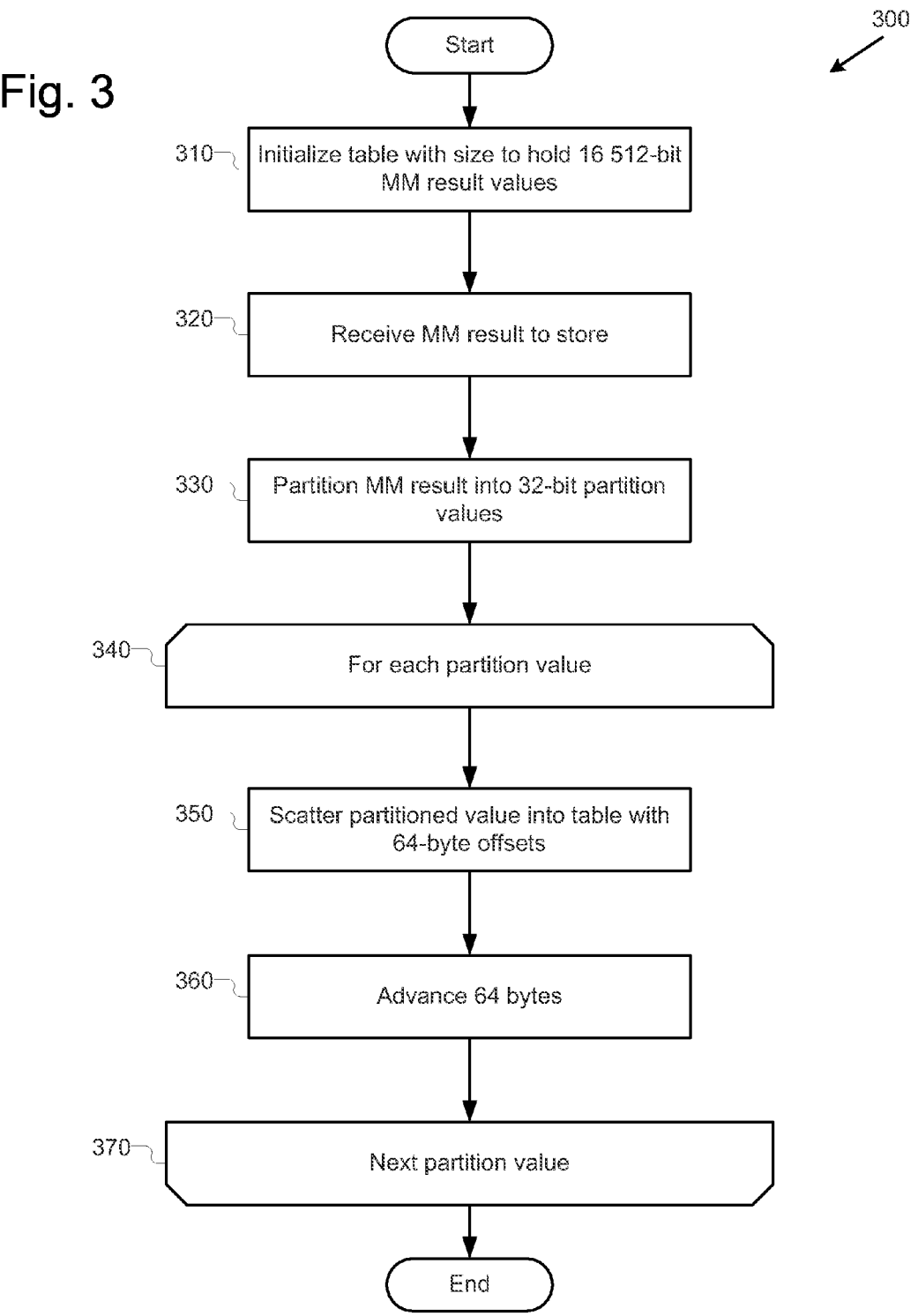
FIG. 3 illustrates an example Montgomery Multiplication result scattering process, in accordance with various embodiments.

FIG. 3 illustrates an MM result scattered storing process 300, in accordance with various embodiments. In various embodiments, the process may be performed by the MM result storing module 120, after an initialization routine initialized the table 150 for scattered storing of MM results. In various embodiments, the process 300 may be performed utilizing a window size of 4; in other embodiments, different window sizes may be utilized. The process may begin at operation 320, wherein the initialization routine may initialize the table 150 to hold 16 512-bit MM result values. In various embodiments, operation 320 may not be performed during subsequent scattered storing of MM results, while operations 320-360 may be repeated for scattered storing of later MM results.

Next, at operation 320, the MM result storing module 120 may receive an MM result to be stored scattered in the table 150. At operation 330, the MM result storing module 120 may partition the MM result into 32-bit partition values. In various embodiments, the MM result may be partitioned by dividing the MM result at successive 32-bit offsets. Next, at operation 340, the MM result storing module 120 may begin a loop over every generated partition value. Within this loop, at operation 350, the MM result storing module 120 may store each partitioned value into the table 150 at 64-byte offsets, thereby scattering the partition values in the table 150. Next, at operation 360, the MM result storing module 120 may advance 64-bytes ahead in the table. Then, at operation 370, the loop may repeat for the next generated partition value. Once there are no more partition values to store in the table 150, the process may then end.

In various embodiments, the MM scattered storing process 300 may be performed in part through execution of the following function code. The function code may take an input pointer "table", which may point to 1024 bytes of allocated memory. The memory may be aligned at 64 bytes, as described above. In various embodiments, the function code may also take an input pointer "constant", which may point to a 512-bit source MM result, and a number "index", which may specify an index for the MM result.

```
void dword_scatter(uint32_t *table, uint32_t *constant, int index)
{
    int i;
    for (i=0; i<16; i++)
    {
        table [i*16 + index] = constant[i];
    }
}
```

Figure 4:
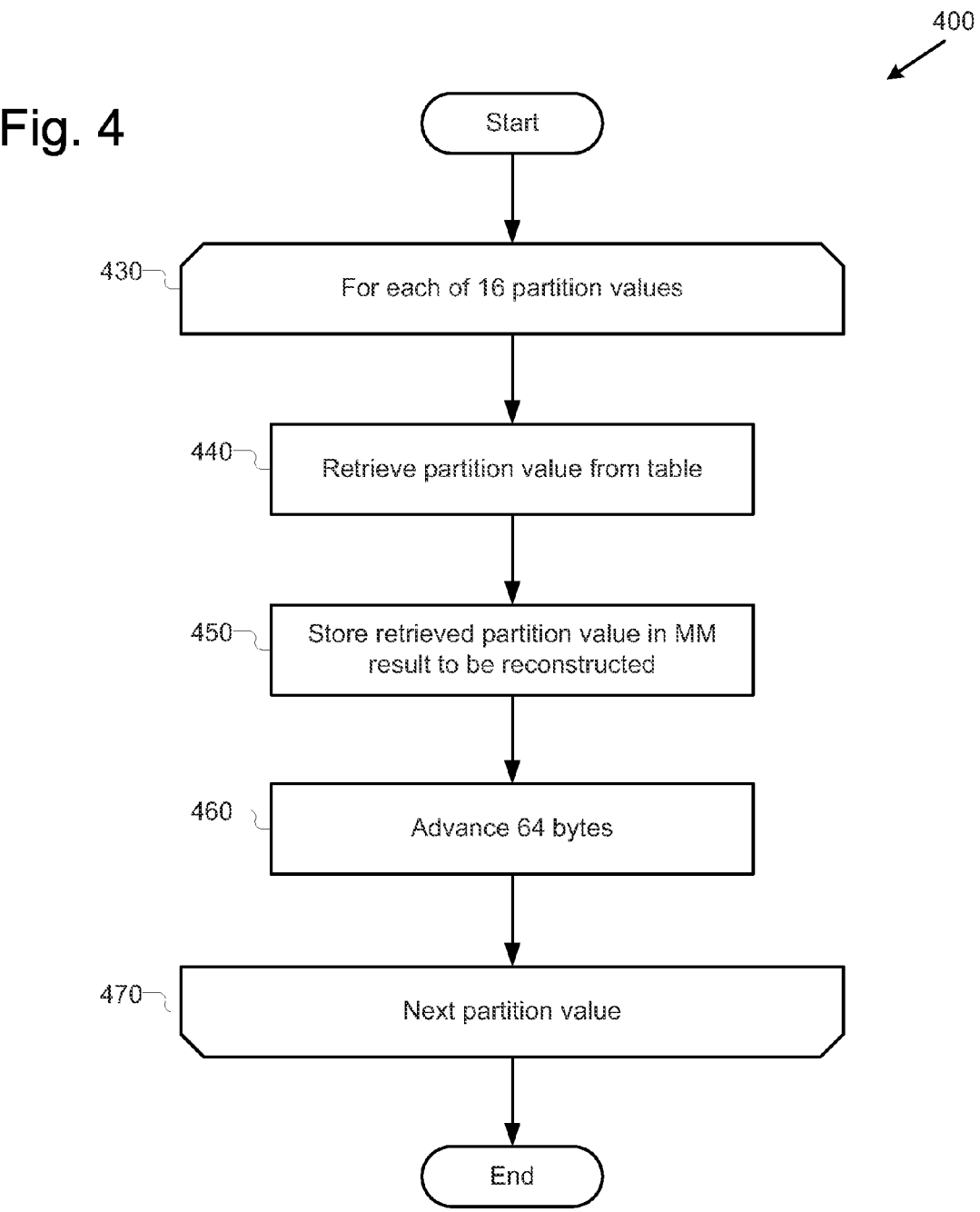
FIG. 4 illustrates an example Montgomery Multiplication result gathering process, in accordance with various embodiments.

FIG. 4 illustrates an MM result gathering process 400, in accordance with various embodiments. In various embodiments, the process may be performed by the MM result gathering module 130 to reconstruct and retrieve an MM result from partitioned values stored scattered in the table 150. In various embodiments, the process 400 may be performed with the MM result gathering module 120 utilizing a window size of 4; in other embodiments, different window sizes may be utilized. The process may start at operation 430, where the MM result gathering module 130 may begin a loop to gather 16 partition values. Within this loop, at operation 440, the MM result gathering module 130 may retrieve a partition value from the table 150. Next, at operation 450, the MM result gathering module 130 may store the retrieved partition value into the MM result that is being reconstructed from the scattered partition values. Next, at operation 460, the MM result gathering module 130 may advance 64-bytes ahead in the table. Then, at operation 470, the loop may repeat for the next generated partition value. Once all 16 partition values are retrieved from the table 150, the process may then end.

In various embodiments, the MM gathering process 400 may be performed in part through execution of the following function code. The function code may take an input pointer "table", which may point to 1024 bytes of allocated memory. The memory may be aligned at 64 bytes, as described above. In various embodiments, the function code may also take an input pointer "constant", which may point to a 512-bit destination MM result, and a number "index", which may specify an index for the MM result.

```
void dword_gather (uint32_t *table, uint32_t *constant, int index)
{
    int i;
    for (i=0; i<16; i++)
    {
        constant[i] = table [i*16 + index];
    }
}
```

Figure 5:
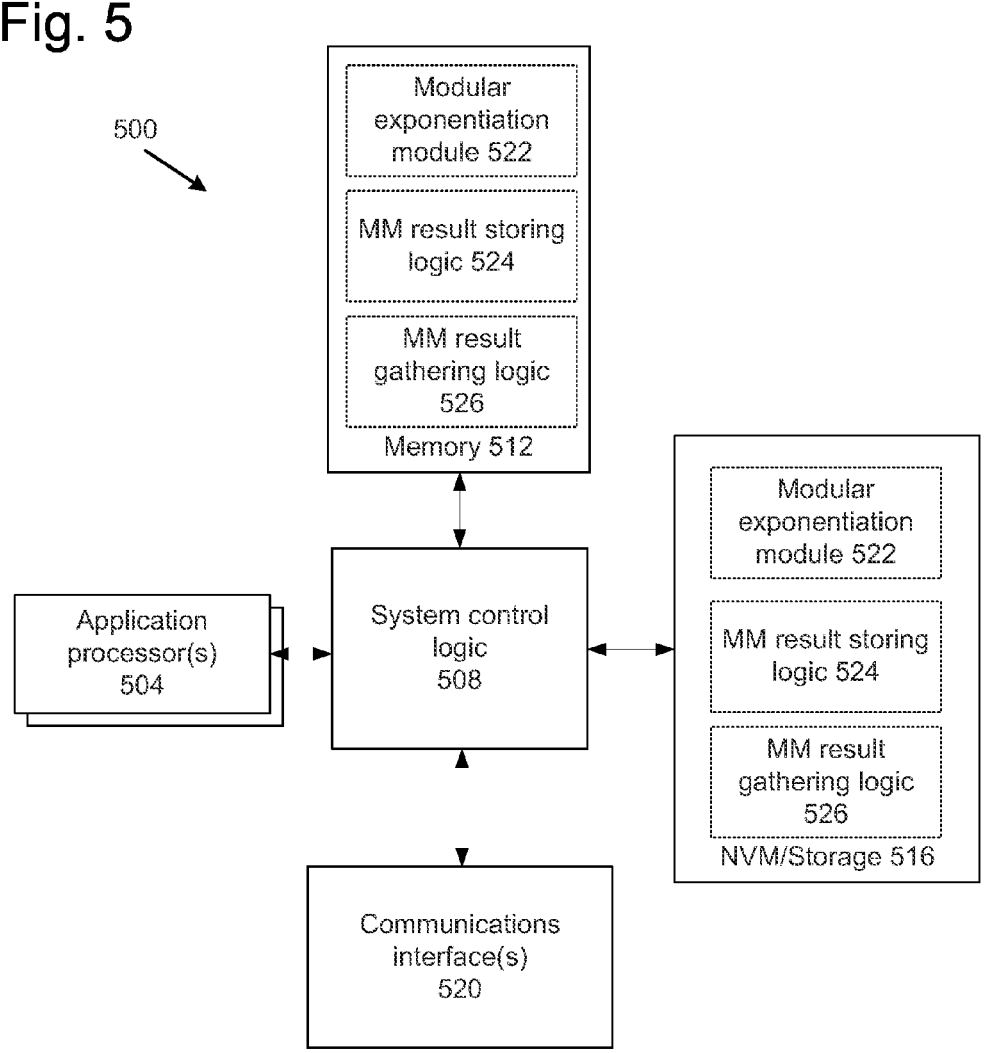
FIG. 5 illustrates an example computing environment, in accordance with various embodiments.

The techniques and apparatuses described herein may be implemented into a system using suitable hardware, firmware, and/or software to configure as desired. FIG. 5 illustrates, for one embodiment, an example system 500 including at least processors 504, each having one or more processor cores, system control logic 508 coupled to at least one of the processors 504, memory 512 coupled to system control logic 508, non-volatile memory (NVM)/storage 516 coupled to system control logic 508, and one or more communications interface(s) 520 coupled to system control logic 508. In various embodiments, the system 500 may include components of a CPU-based software system, a management engine system, or a combination of the two.

System control logic 508 for one embodiment may include any suitable interface controllers to provide for any suitable interface to at least one of the processors 504 and/or to any suitable device or component in communication with system control logic 508. The processors may include a dedicated application processor upon which an application environment may be operated, as well as a separate service processor upon which a manageability engine may be operated. The system may include additional processors or processing cores (not illustrated).

System control logic 508 for one embodiment may include one or more memory controller(s) to provide an interface to memory 512. System memory 512 may be used to load and store data and/or instructions, for example, for system 500. System memory 512 for one embodiment may include any suitable volatile memory, such as suitable dynamic random access memory (DRAM), for example.

System control logic 508 for one embodiment may include one or more input/output (I/O) controller(s) to provide an interface to NVM/storage 516 and communications interface(s) 520.

NVM/storage 516 may be used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the communications interface(s) 520.

Memory 512 and NVM/storage 516 may include, in particular, temporal and persistent copies of logic, respectively. In the illustrated example, this logic may include modular exponentiation module (with initialization routine) 522, MM result storing logic 524 and MM result gathering logic 526. The MM result storing logic 524 and MM result gathering logic 526 may include instructions that, when executed by at least one of the processors 504, result in the system 500 performing MM result scattered storing and/or MM result gathering in conjunction with the modules described herein. In some embodiments, the MM result storing logic 524 and MM result gathering logic 526 may additionally/alternatively be located in the system control logic 508.

Communications interface(s) 520 may provide an interface for system 500 to communicate over one or more network(s) and/or with any other suitable device. Communications interface(s) 520 may include any suitable hardware and/or firmware. Communications interface(s) 520 for one embodiment may include, for example, a network adapter, a wireless network adapter, a telephone modem, and/or a wireless modem. For wireless communications, communications interface(s) 520 for one embodiment may use one or more antenna(s).

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC). For at least one embodiment, the SoC may be utilized in a smart phone, cell phone, tablet, or other mobile device.

In various embodiments, system 500 may have more or less components, and/or different architectures.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. A computer-implemented method comprising:
   initializing a table, by a computing device, in a memory of the computing device, the table having a size;
   performing, by the computing device, a first plurality of Montgomery Multiplications;
   storing, by the computing device, results of the first plurality of Montgomery Multiplications into the table, the storing of each result into the table including:
   partitioning the particular result into multiple partition values; and
   storing the partition values of the particular result scattered across the table; and
   performing, by the computing device, a second plurality of Montgomery Multiplications using the stored partition values of the results of the first plurality of Montgomery Multiplications scattered in the table;
   wherein initializing the table comprises selecting the size of the table to at least reduce a number of memory accesses performed during retrieval of the stored partition values of the results of the first plurality of Montgomery Multiplications scattered in the table during performance of the second plurality of Montgomery Multiplications.

2. The method of claim 1, wherein selecting the size of the table also comprises selecting the size of the table to reduce a number of Montgomery Multiplications performed in the second plurality of Montgomery Multiplications.

3. The method of claim 1, wherein:
   the first and second plurality of Montgomery Multiplications are performed as part of a modular exponentiation calculation; and
   selecting the size of the table comprises selecting the size of the table based also in part on a window size for the modular exponentiation calculation.

4. The method of claim 3, further comprising setting, by the computing device, the window size to 4.

5. The method of claim 1, wherein initializing the table comprises initializing the table to hold 16 results of Montgomery Multiplications.

6. The method of claim 5, wherein the results of the first and second plurality of Montgomery Multiplications comprise 512-bit values.

7. The method of claim 6, wherein:
   partitioning a particular result of a Montgomery Multiplication comprises partitioning the particular Montgomery Multiplication result into 32-bit partition values; and
   storing the partition values of a particular Montgomery Multiplication result scattered across the table comprises storing each partition value of a particular Montgomery Multiplication result with offset by at least 64 bytes of another partition value of the particular Montgomery Multiplication result.

8. The method of claim 1, wherein:
   the memory comprises a cached memory; and
   storing the partition values of a particular Montgomery Multiplication result scattered across the table comprises writing the partition values the particular Montgomery Multiplication result to the cached memory.

9. An apparatus comprising:
   a computer-readable memory;
   one or more computer processors coupled to the memory;
   a Montgomery Multiplication result storing module configured to be operated by the one or more computer processors to store partition values of Montgomery Multiplication results scattered across a table in the memory;
   a Montgomery Multiplication result gathering module configured to be operated by the one or more computer processors to reconstruct Montgomery Multiplication results from corresponding stored partition values scattered across the table; and
   an initialization routine to be operated by the one or more computer processors, and configured to initialize the table, wherein the initialization module is configured to initialize the table in a manner such that memory operations performed by the Montgomery Multiplication result gathering module during reconstruction of Montgomery Multiplication results based on corresponding partition values stored and scattered across the table by the Montgomery Multiplication result storing module are reduced.

10. The apparatus of claim 9, further comprising a modular exponentiation module configured to be operated by the one or more computer processors to:
    perform first Montgomery Multiplication results to generate Montgomery Multiplication results for storage by the Montgomery Multiplication result storing module;
    request the first Montgomery Multiplication results from the Montgomery Multiplication result gathering module; and
    based on the first Montgomery Multiplication results returned by the Montgomery Multiplication result gathering module, perform second Montgomery Multiplications to calculate a modular exponentiation values.

11. The apparatus of claim 10, wherein the initialization routine is further configured to initialize the table in manner to reduce a number of second Montgomery Multiplications performed by the modular exponentiation module to calculate the module exponentiation value.

12. The apparatus of claim 10, wherein the initialization routine is further configured to initialize the table to a size based on a window size used by the modular exponentiation module to calculate the modular exponentiation value.

13. The apparatus of claim 9, wherein:
    the Montgomery Multiplication results comprise 512-bit values;
    the initialization routine is configured to initialize the table to hold 16 Montgomery Multiplication results; and
    the Montgomery Multiplication result module is configured to:

partition each Montgomery Multiplication result to be stored into 32-bit partition values; and store each partition value of a particular in Montgomery Multiplication result in the table offset from another partition value of the particular Montgomery Multiplication result by at least 64 bytes.

14. The apparatus of claim 13, wherein:
the memory comprises a cached memory; and
the initialization routine is configured to initialize the table in the cached memory.

15. One or more non-transitory computer-readable media comprising instructions that, in response to execution by a computing device, cause the computing device to perform one or more operations comprising:

initializing a table in a memory of the computing device, the table having a size;

performing a first plurality of Montgomery Multiplications;

storing results of the first plurality of Montgomery Multiplications into the table, the storing of each result into the table including:
partitioning the particular result into multiple partition values; and
storing the partition values of the particular result scattered across the table; and performing a second plurality of Montgomery Multiplications using the stored partition values of the results of the first plurality of Montgomery Multiplications scattered in the table;

wherein initializing the table comprises selecting the size of the table to at least reduce a number of memory accesses performed during retrieval of the stored partition values of the results of the first plurality of Montgomery Multiplications scattered in the table during performance of the second plurality of Montgomery Multiplications.

16. The computer-readable media of claim 15, wherein selecting the size of the table also comprises selecting the size of the table to reduce a number of Montgomery Multiplications performed in the second plurality of Montgomery Multiplications.

17. The computer-readable media of claim 15, wherein:
the first and second plurality of Montgomery Multiplications are performed as part of a modular exponentiation calculation; and
selecting the size of the table comprises selecting the size of the table based also in part on a window size for the modular exponentiation calculation.

18. The computer-readable media of claim 17, wherein the operations further comprise setting the window size to 4.

19. The computer-readable media of claim 15, wherein:
the results of the first and second plurality of Montgomery Multiplication comprise 512-bit values;
initializing the table comprises initializing the table to hold 16 results of Montgomery Multiplication;
partitioning the particular result of a Montgomery Multiplication comprises partitioning the respective Montgomery Multiplication result into 32-bit partition values; and
storing the partition values of a particular Montgomery Multiplication result scattered across the table comprises storing each partition value of a particular Montgomery Multiplication result with offset by at least 64 bytes of another partition value of the particular Montgomery Multiplication result.

20. The computer-readable media of claim 15, wherein:
the memory comprises a cached memory; and
storing the partition values of a particular Montgomery Multiplication result scattered across the table comprises writing the partition values the particular Montgomery Multiplication result to the cached memory.

* * * * *